United States Patent
Miyawaki et al.

(10) Patent No.: US 9,054,370 B2
(45) Date of Patent: Jun. 9, 2015

(54) ELECTRIC CELL AND BATTERY ASSEMBLY

(75) Inventors: Yasutaka Miyawaki, Kyoto (JP);
Yoshinori Ishimoto, Kyoto (JP);
Atsushi Nishida, Kyoto (JP); Hirokazu Ito, Kyoto (JP)

(73) Assignee: GS YUASA INTERNATIONAL LTD, Kyoto-Shi, Kyoto (JP)

( * ) Notice: Subject to any disclaimer, the term of this patent is extended or adjusted under 35 U.S.C. 154(b) by 537 days.

(21) Appl. No.: 13/431,885

(22) Filed: Mar. 27, 2012

(65) Prior Publication Data

US 2012/0251873 A1 Oct. 4, 2012

(30) Foreign Application Priority Data

Mar. 28, 2011 (JP) ................. 2011-070559

(51) Int. Cl.
*H01M 2/20* (2006.01)
*H01M 2/34* (2006.01)
*H01M 2/10* (2006.01)

(52) U.S. Cl.
CPC ............... *H01M 2/34* (2013.01); *H01M 2/206* (2013.01); *H01M 2/1077* (2013.01)

(58) Field of Classification Search
CPC ...... H01M 2/206; H01M 2/34; H01M 2/1077
USPC .............................................. 429/175, 178
See application file for complete search history.

(56) References Cited

U.S. PATENT DOCUMENTS

| | | | | |
|---|---|---|---|---|
| 5,576,516 | A | * | 11/1996 | Kameyama et al. ....... 174/138 F |
| 2003/0048091 | A1 | | 3/2003 | Sato et al. |
| 2011/0135976 | A1 | * | 6/2011 | Byun .............................. 429/56 |
| 2012/0038322 | A1 | * | 2/2012 | Moorhead et al. ............ 320/136 |

FOREIGN PATENT DOCUMENTS

| | | |
|---|---|---|
| JP | 4-38664 UM | 3/1992 |
| JP | 8-50888 A | 2/1996 |
| JP | 2003-086219 A | 3/2003 |
| JP | 2003-157828 A | 5/2003 |
| JP | 2007-012485 A | 1/2007 |
| JP | 2009-266614 A | 11/2009 |

* cited by examiner

*Primary Examiner* — Muhammad Siddiquee
(74) *Attorney, Agent, or Firm* — McGinn IP Law Group, PLLC

(57) ABSTRACT

Each of electric cells constituting a battery assembly is provided with external terminals. The upper end of the electric cell is covered with an upper cap surrounding the external terminals whereas the lower end of the electric cell is covered with a lower cap. The electric cell is held between an upper holder and a lower holder via the upper cap and the lower cap. The upper cap includes a protector including ribs projecting along both sides of an inspecting terminal projecting through a terminal opening. The upper ends of the ribs are located above the inspecting terminal. Consequently, a metallic tool or the like cannot be brought into contact with the inspecting terminal, thereby preventing short-circuiting. Thus, it is possible to secure an excellent assembling performance while enhancing the safety of assembling work.

19 Claims, 15 Drawing Sheets

ELECTRIC CELL AND BATTERY ASSEMBLY

CROSS-REFERENCE TO RELATED APPLICATIONS

This application claims priority from Japanese Patent Application No. 2011-70559, the disclosure of which is incorporated herein by reference in their entireties.

BACKGROUND OF THE INVENTION

1. Field of the Invention

The present invention relates to a plurality of electric cells (i.e., a battery cell) and a battery assembly (i.e., a battery module), in which the electric cells are electrically connected in the form of a module.

2. Description of the Related Art

An external terminal of one of electric cells constituting a battery assembly is electrically connected to an external terminal of another electric cell disposed adjacently via a conductive member such as a bus bar (see, for example, Japanese Unexamined Patent Publication Nos. 2003-86219 and 2009-266614).

When an external terminal or a connecting rod for connecting the external terminal to a power generating element housed inside of an electric cell is accidentally brought into contact with, for example, a metallic tool in assembling a battery assembly, short-circuiting occurs. Use of a jig to prevent such short-circuiting requires a process for attaching or detaching the jig, thereby degrading assembling performance.

SUMMARY OF THE INVENTION

An object of the present invention is to secure an excellent assembling performance while enhancing safety of assembling work in a battery assembly.

According to a first aspect of the invention, an electric cell includes: a package; an external terminal unit disposed at one end of the package; and a cap disposed at the end of the package, the cap including a protector, which is disposed adjacently to a part of the external terminal unit, and whose at least part is located in a position more apart from the package than a part of the external terminal unit.

The protector is disposed such that at least a part thereof is more apart from the package than a part of the external terminal unit, thereby securely preventing any unintentional contact of a metallic tool or the like, which may cause short-circuiting, with a part of the external terminal unit, so as to enhance the safety of assembling work. The protector is disposed adjacently to a part of the external terminal unit, and therefore, it neither covers nor conceals a part of the external terminal unit. Consequently, an electric wire, for example, can be connected to a part of the external terminal unit. The protector is formed in the cap. Unlike a jig, the cap need not be detached after it is attached once. In these points, an excellent assembling performance can be secured.

According to a second aspect of the invention, the external terminal unit includes a first terminal and a second terminal; and the cap includes walls surrounding the first terminal in the external terminal unit, the first terminal being electrically connected to a conductive member projecting from the wall of the cap, and the second terminal projecting from the wall of the cap and being protected by the protector.

According to a third aspect of the invention, the second terminal projects inward from one end of the package along the package. Although the function of the second terminal is not specially limited, the second terminal may be, for example, an inspecting terminal.

According to a forth aspect of the invention, it is preferable that the protector should include an extension projecting from the wall and extending along the side of the second terminal.

According to a fifth aspect of the invention, it is preferable that the tip of the extension should be located in a position more apart from the wall than the tip of the second terminal.

According to a sixth aspect of the embodiment, it is much preferable that the extension should include a plurality of ribs spaced with a clearance on both sides of the second terminal.

According to a seventh aspect of the invention, when the plurality of ribs are connected at the tips thereof to each other via a connector, it is much preferable that the strength should be enhanced while it is possible to securely prevent any unintentional contact of a metallic tool or the like with the second terminal arbitrarily sideways.

According to an eighth aspect of the invention, it is much preferable that the plurality of ribs should have protrusions protruding oppositely to each other.

According to a ninth aspect of the invention, it is much preferable that the upper end of the protector should be located above the second terminal.

According to a tenth aspect of the invention, an electric cell is formed into a substantially rectangular shape and has a top surface formed into a rectangular shape, as viewed on a plane, having long sides and short sides, both end surfaces extending from short pieces at both ends of the long sides of the top surface in a substantially orthogonal direction, and both side surfaces extending from long sides at both ends of the short sides of the top surface in a substantially orthogonal direction. The cap has a top wall formed into a rectangular shape, as viewed on a plane, in parallel to the top surface, a first end wall extending along one of the end surfaces from the top wall, a second end wall extending toward the top surface, and first and second side walls extending along both side surfaces. The protector extends oppositely to the first end wall along the long sides from the second end wall.

According to an eleventh aspect of the invention, a battery assembly includes the plurality of electric cells having any of the above-described configurations.

According to a twelfth aspect of the invention, it is preferable that the battery assembly should further include an abutment for the cap, the abutment being disposed at one end of the package and abutting against the cap, wherein the abutment enables the plurality of electric cells to be positioned.

DETAILED DESCRIPTION OF THE PREFERRED EMBODIMENTS

A detailed description will be given below of preferred embodiments according to the present invention with reference to the attached drawings.

First Preferred Embodiment

FIGS. 1 to 4 show a battery assembly (i.e., a battery module) 1 in a first preferred embodiment according to the present invention. The battery assembly 1 includes seven square electric cells (i.e., a battery cell) 2 that are non-aqueous electrolytic secondary batteries.

Figure 5:
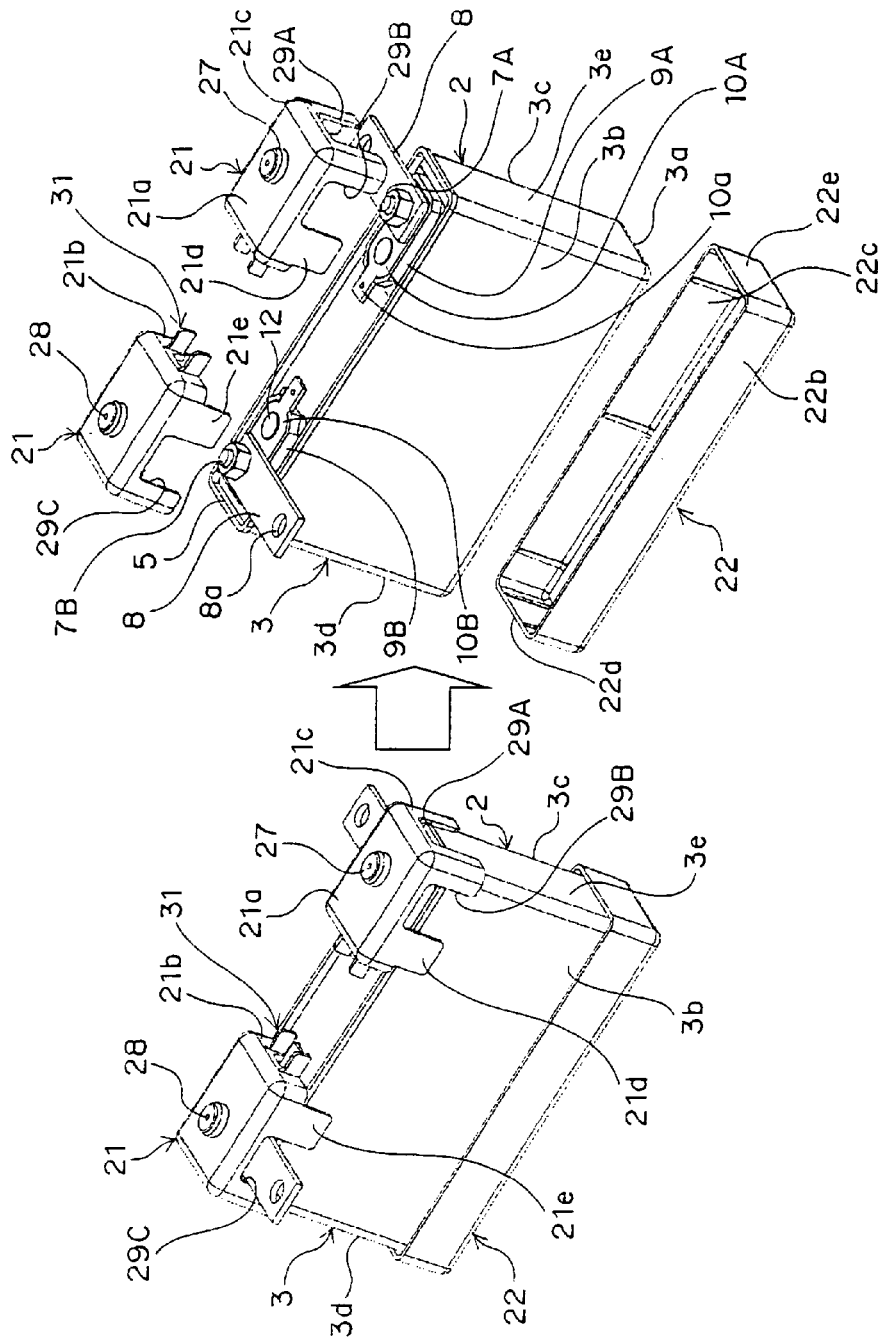
FIG. 5 is a perspective view of the electric cell, an upper cap, and a lower cap.
Figure 6:
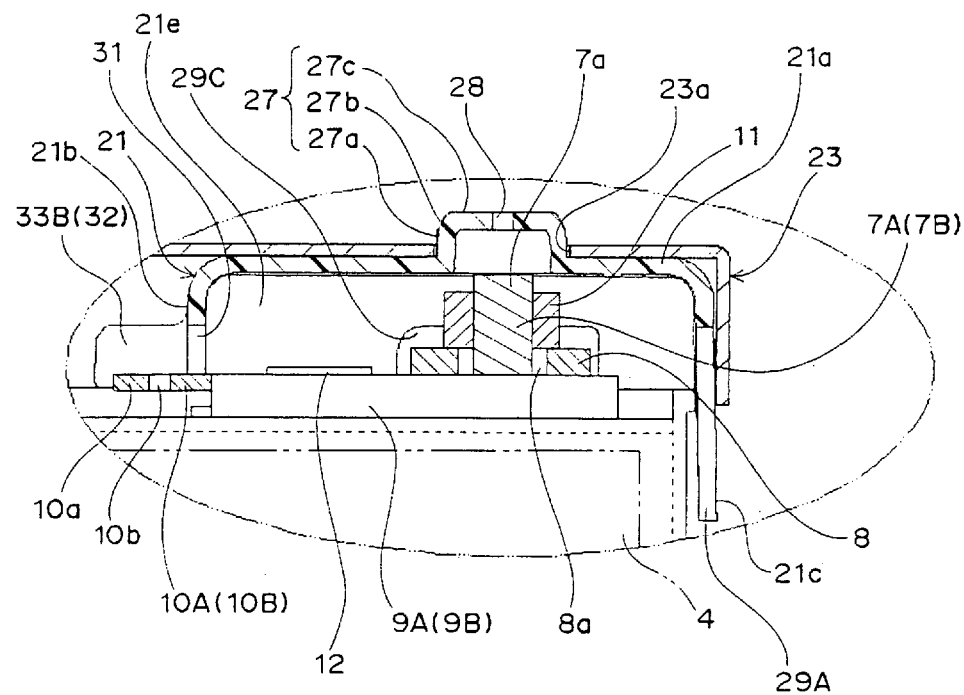
FIG. 6 is an enlarged cross-sectional view of the upper cap disposed in the electric cell.
Figure 7:
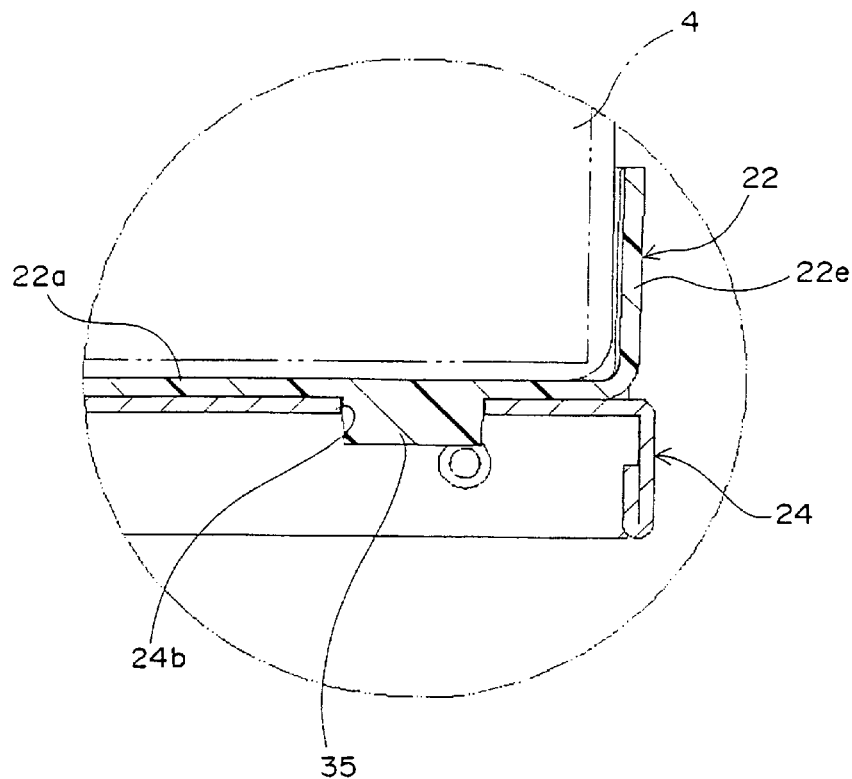
FIG. 7 is an enlarged cross-sectional view of the lower cap disposed in the electric cell.
Figure 8A:
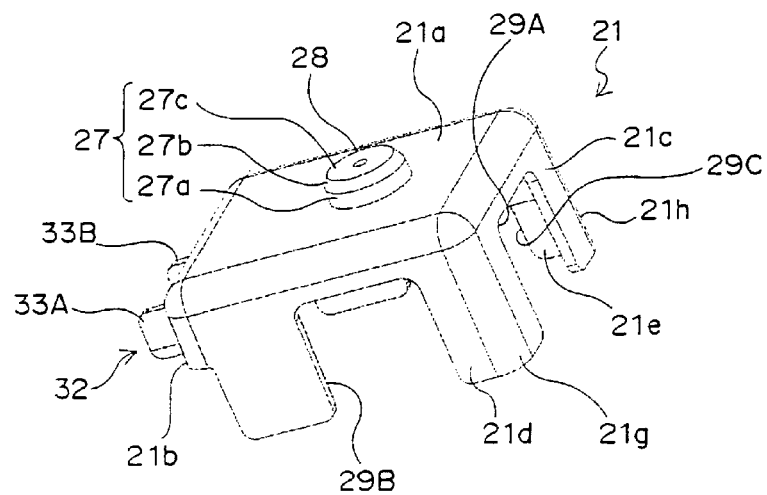
FIG. 8A is a perspective view of the upper cap, as viewed from above.
Figure 8B:
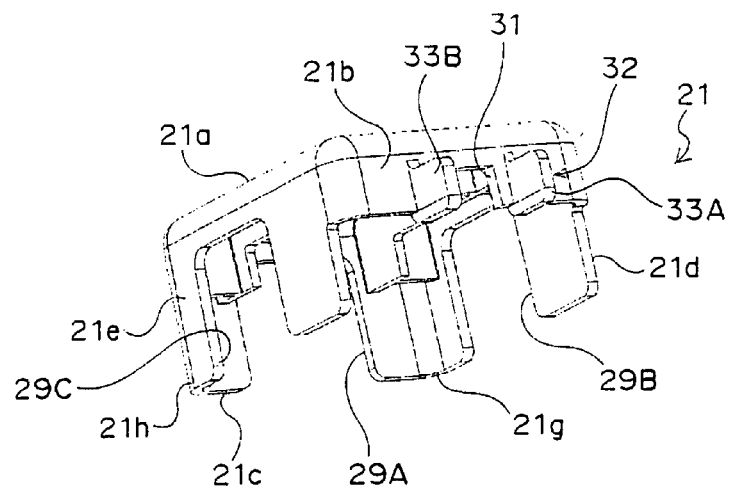
FIG. 8B is a perspective view of the upper cap, as viewed from above at an angle different from that of FIG. 8A.
Figure 8C:
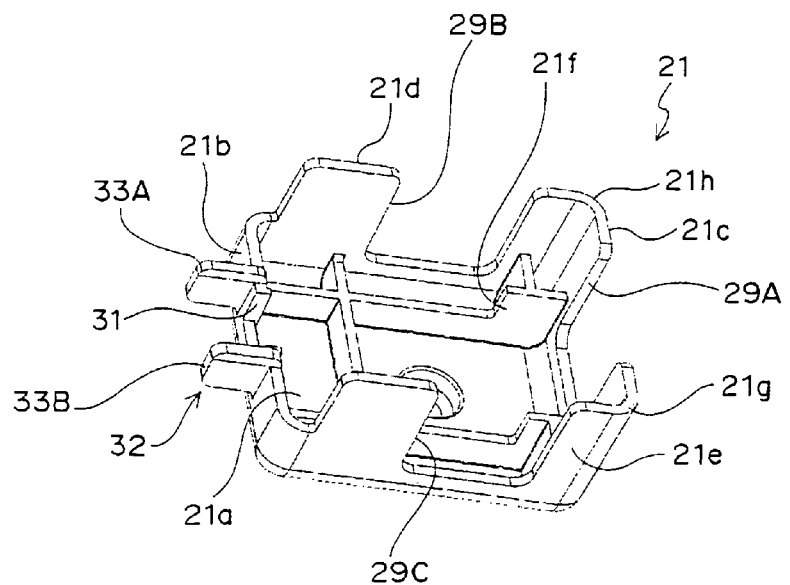
FIG. 8C is a perspective view of the lower cap, as viewed from below.
Figure 9A:
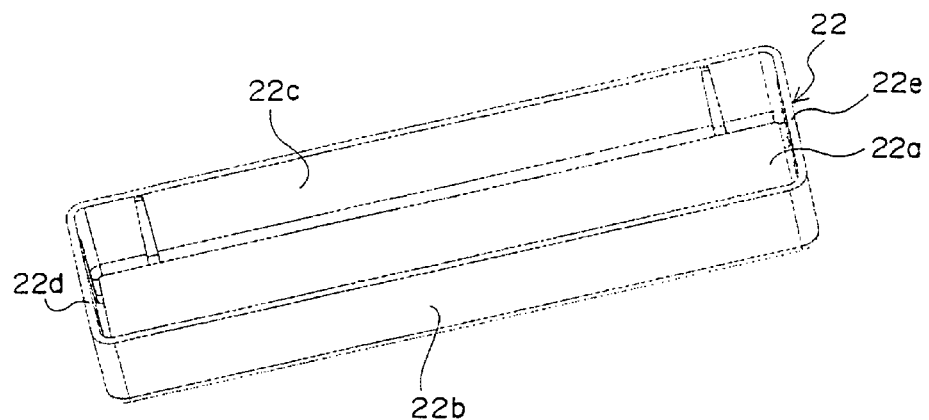
FIG. 9A is a perspective view of the lower cap, as viewed from above.
Figure 9B:
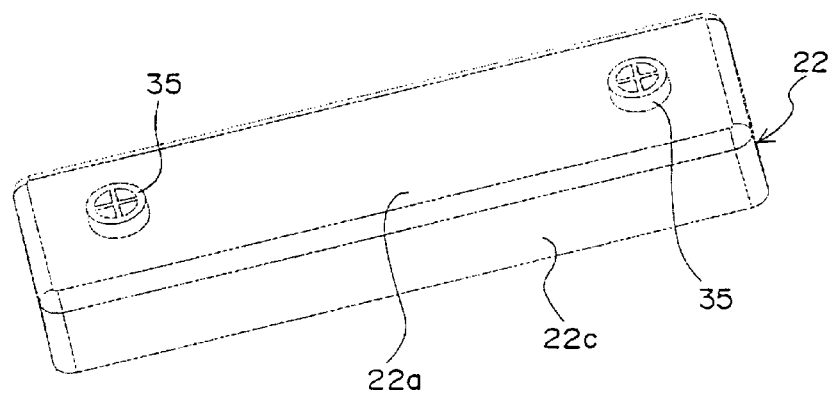
FIG. 9B is a perspective view of the lower cap, as viewed from below.

Further referring to FIGS. 5 to 7, a power generating element 4 (schematically shown in FIGS. 6 and 7) is contained inside a cell container 3 together with an electrolyte in each of the electric cells 2. An opening formed at an upper end of the cell container 3 is covered with a cover 5.

The cell container 3 in the present preferred embodiment is provided with side walls 3b to 3e extending upward from a rectangular bottom wall 3a. The side walls include a pair of long side walls 3b and 3c opposite to each other and a pair of short side walls 3d and 3e, each having a smaller area than that of each of the long side walls 3b and 3c, opposite to each other. Out of four sides of a rectangle defined by the bottom wall 3a as the cell container 3 is viewed on a plane, the long side walls 3b and 3c extend from a pair of long sides whereas the short side walls 3d and 3e extend from a pair of short sides. The cover 5 is formed into a substantially rectangular shape. The cell container 3 and the cover 5 constitute a substantially flat, rectangular package. The side walls 3b to 3e of the cell container 3 are covered with an insulating sheet, not shown.

Figure 4:
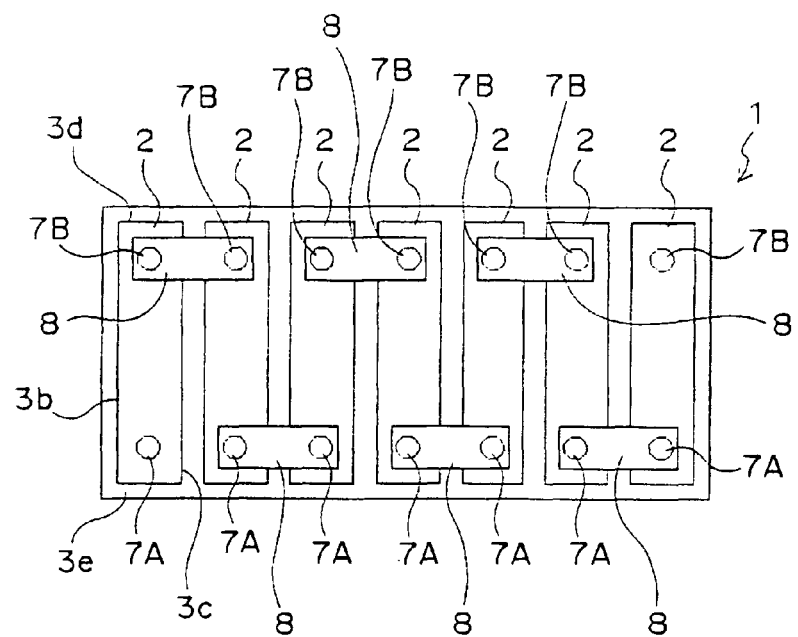
FIG. 4 is a schematic plan view of a connection path for electric cells in the battery assembly in the first preferred embodiment.

As is most clearly shown in FIG. 4, the seven electric cells 2 constituting the battery assembly 1 are aligned such that the cell containers 3 of the adjacent two electric cells 2 are parallel to each other in a longitudinal direction, as viewed from the cover 5. In other words, the seven electric cells 2 are arranged in such a manner that the long side wall 3b of one of the adjacent electric cells 2 faces the long side wall 3c of the other electric cell 2 with a clearance. A positive and a negative external terminals 7A and 7B are disposed near both ends of the cover 5 in the electric cell 2. The positive and negative external terminals 7A and 7B in each of the electric cells 2 are electrically connected to the other external terminals 7A and 7B in the other of the adjacent electric cells 2 via bus bars (i.e., conductive members) 8. In this manner, the seven electric cells 2 are connected in series to each other. In FIG. 4, the external terminal 7A of the leftmost electric cell 2 constitutes a positive electrode of the battery assembly 1 whereas the external terminal 7B of the rightmost electric cell 2 constitutes a negative electrode of the battery assembly 1.

As shown in FIGS. 5 and 6, heads, not shown, of the external terminals 7A and 7B and connecting rods 10A and 10B are contained in gaskets 9A and 9B mounted at the upper surface of the cover 5. A shaft 7a of each of the external terminals 7A and 7B, having a male screw formed thereat, projects upward from the head, and penetrates each of the connecting rods 10A and 10B. The shaft 7a of each of the external terminals 7A and 7B is inserted into a through hole 8a formed at one end of the bus bar 8, and then, is fixed to one end of the bus bar 8 via a nut 11. Each of the connecting rods 10A and 10B is connected to a current collector, not shown, inside of the cell container 3 via a rivet 12, and consequently, the current collector is connected to the power generating element 4. The external terminals 7A and 7B constitute first terminals according to the present invention. The external terminals (i.e., the first terminals) 7A and 7B and the connecting rods 10A and 10B constitute an external terminal unit according to the present invention.

A rectangular inspecting terminal 10a (i.e., a second terminal) having a small width is disposed at one end (i.e., an end on a side opposite to each of the external terminals 7A and 7B) in each of the connecting rods 10A and 10B. As is most clearly shown in FIG. 5, the inspecting terminals 10a laterally project from the gaskets 9A and 9B (in a longitudinal direction of the package, or the cover 5 and inward on the side opposite to each of the external terminals 7A and 7B), to be thus positioned above the upper surface of the cover 5 with a clearance. A screw hole 10b for screwing a screw, not shown, for connecting an electric wire is formed near the tip of the inspecting terminal 10a.

The battery assembly 1 includes a holding structure 20 for holding the seven electric cells 2 in the above-described arrangement. The holding structure 20 is provided with an upper cap (i.e., a first cap) 21 and a lower cap (i.e., a second cap) 22, which are disposed in each of the electric cells 2. The upper cap 21 and the lower cap 22 are made of a resin in the present preferred embodiment. Moreover, the holding structure 20 is provided with an upper holder (i.e., a first holder) 23 and a lower holder (i.e., a second holder) 24, which hold the electric cells 2 capped with the upper cap 21 and the lower cap 22 in a vertical direction in the drawings. In addition, the holding structure 20 is provided with a pair of side parts 25 and 26 which connect the upper holder 23 and the lower holder 24 to each other. A monitor 37 is fixed to the side part 25.

A description will be given of the upper cap 21 with reference to FIGS. 5, 6, and 8A to 8C. The two upper caps 21 are disposed at the upper end of the electric cell 2 in such a manner as to cap the pair of external terminals 7A and 7B, respectively. The upper cap 21 includes a rectangular top wall 21a, a front wall 21b and a rear wall 21c extending from lengthwise sides of the top wall 21a, and side walls 21d and 21e extending from lateral sides of the top wall 21a. A rib structure 21f is disposed at the lower surface of the top wall 21a.

The lower end of the front wall 21b and the lower end of the rib structure 21f near the rear wall 21c are placed at the upper end of the cell container 3, so that the upper cap 21 is held while being disposed in the electric cell 2. The upper cap 21 disposed in the electric cell 2 surrounds the external terminal 7A or 7B and their surroundings. Specifically, when the upper cap 21 is disposed in the electric cell 2, the top wall 21a of the upper cap 21 is positioned above the external terminal 7A or 7B, the upper gasket 9A or 9B, and the connecting rod 10A or 10B. The rear wall 21c extends along the upper end (i.e., near the cover 5) of the short side wall 3d or 3e of the cell container 3. Additionally, the side walls 21d and 21e extend along the upper ends (i.e., near the cover 5) of the pair of long side walls 3b and 3c of the cell container 3. Moreover, corners 21g and 21h defined by the rear wall 21c and the side walls 21d and 21e extend along corners defined by the short side wall 3d or 3e and the long side walls 3b and 3c in the cell container 3.

One upper projection (i.e., a first projection) 27 is formed at the upper surface (i.e., the outer surface) of the top wall 21a of the upper cap 21. The upper projection 27 in the present preferred embodiment is generally formed into a substantially flat columnar shape. In particular, the upper projection 27 in the present preferred embodiment includes a columnar portion 27a projecting from the upper surface of the top wall 21a and having a predetermined diameter, and a tapered portion 27b gradually reduced in diameter toward a foremost tip formed at the tip (i.e., the upper end) of the columnar portion 27a. Moreover, a tip surface 27c of the upper projection 27 is substantially flat.

As is most clearly shown in FIG. 6, the external terminal 7A or 7B is located immediately under the upper projection 27. An inspecting through hole 28 penetrates from the tip surface 27c of the upper projection 27 to the lower surface of the top wall 21a of the upper cap 21. That is to say, the inspecting through hole 28 reaches the external terminal 7A or 7B capped with the upper cap 21 from the outside of the upper cap 21.

Bus bar openings 29A, 29B, and 29C are formed on the rear wall 21c and the side walls 21d and 21e in the upper cap 21, respectively, in such a manner as to penetrate in a thickness direction. The bus bar openings 29A to 29C are formed such that the bus bar connected to the external terminal 7A or 7B is inserted thereinto, and therefore, the bus bar 8 projects from the upper cap 21. In, for example, FIG. 5, the bus bar 8 connected at one end thereof to the external terminal 7A or 7B is inserted into the bus bar openings 29B of the upper cap 21, and then, projects from the upper cap 21 and extends toward the external terminal, not shown in FIG. 5, of the other electric cell. In the present preferred embodiment, the bus bar opening 29A is a cutout extending from the lower end of the rear wall 21c toward the top wall 21a whereas the bus bar openings 29B and 29C are cutouts extending from the lower ends of the side walls 21d and 21e toward the top wall 21a. Here, as long as the bus bar 8 can be inserted, the bus bar openings 29A to 29C may be through holes penetrating the rear wall 21c and the side walls 21d and 21e in the thickness direction.

A terminal opening 31 allowing the inspecting terminal 10a of the connecting rod 10A or 10B to be inserted therethrough is formed on the front wall 21b of the upper cap 21 in such a manner as to penetrate in the thickness direction. Most of the connecting rod 10A or 10B is contained inside of the upper gasket 9A or 9B. Here, the inspecting terminal 10a as a part of the connecting rod 10A or 10B projects outward of the upper gasket 9 via the terminal opening 31. In the present preferred embodiment, the terminal opening 31 is a cutout extending from the lower end of the front wall 21b toward the top wall 21a. Here, as long as the inspecting terminal 10a can be inserted, the terminal opening 31 may be a through hole penetrating the front wall 21b in the thickness direction.

In order to protect the inspecting terminal 10a projecting outward of the upper cap 21 via the terminal opening 31, a protector 32 including plate-like ribs 33A and 33B is disposed on the front wall 21b of the upper cap 21 in the present preferred embodiment. The protector 32 will be described later.

A description will be given of the lower cap 22 with reference to FIGS. 5, 7, 9A, and 9B. The lower cap 22 is an elongated box having an opening at the upper end thereof, and is disposed at the lower end of the cell container 3 in the electric cell 2. Particularly, the lower cap 22 is provided with a substantially rectangular bottom wall 22a and side walls 22b, 22c, 22d, end 22e extending from the four sides of the bottom wall 22a. When the lower cap 22 is attached to the lower end of the electric cell 2, the bottom wall 3a of the cell container 3 is placed on the bottom wall 22a, and further, the side walls 22b and 22c extend along the long side walls 3b and 3c of the cell container 3, respectively, whereas the side walls 22d and 22e extend along the short side walls 3d and 3e of the cell container 3, respectively.

A pair of lower projections 35 and 35 is formed at the lower surface (i.e., the outer surface) of the bottom wall 22a of the lower cap 22. In the present preferred embodiment, the lower projection 35 is a substantially flat column as a whole.

Figure 1:
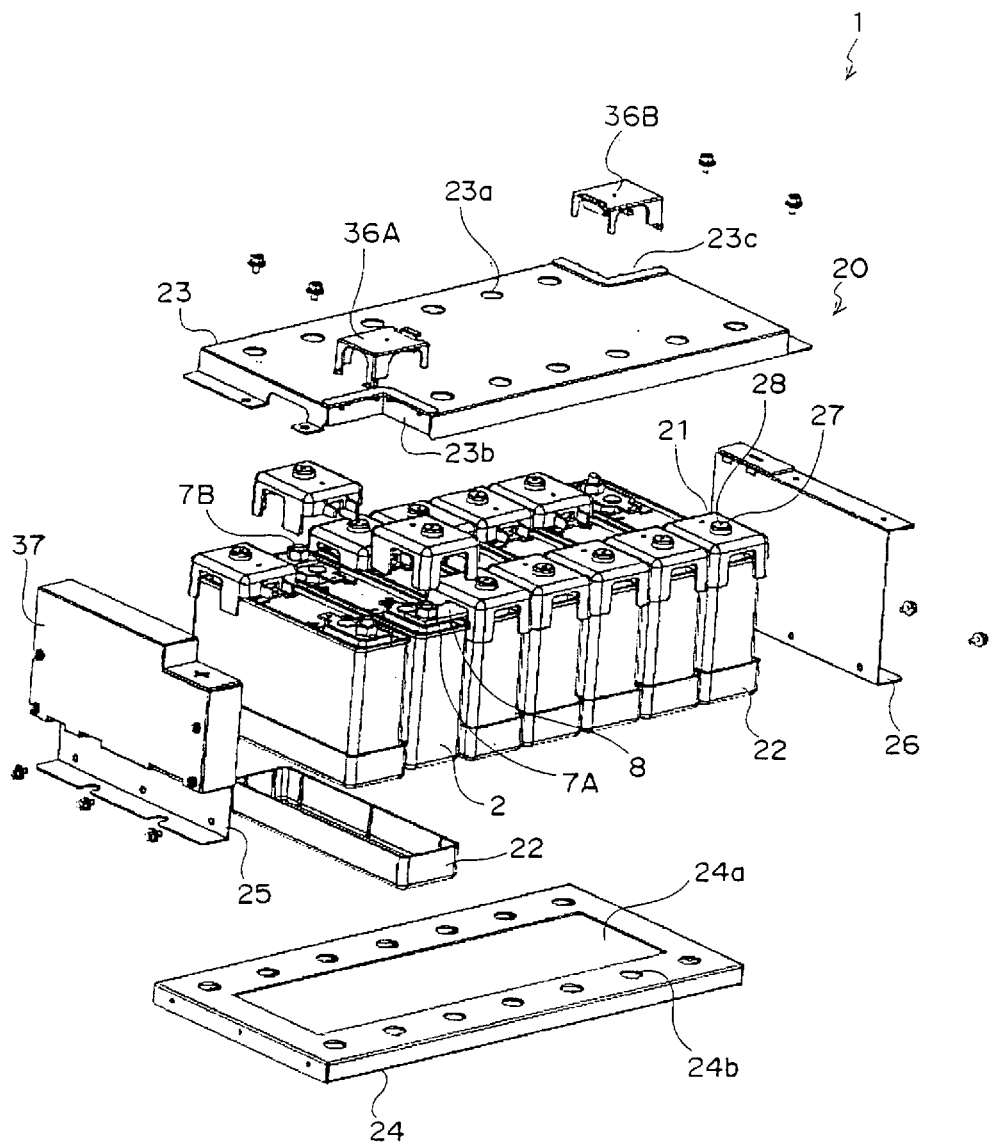
FIG. 1 is an exploded perspective view of a battery assembly in a first preferred embodiment according to the present invention.
Figure 2:
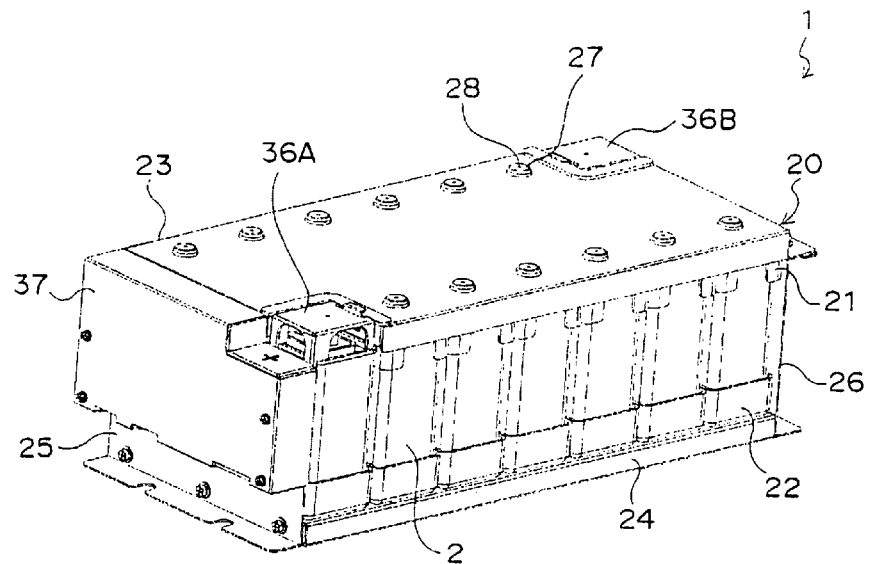
FIG. 2 is a perspective view of the battery assembly in the first preferred embodiment, as viewed from above.

The upper holder 23 in the present preferred embodiment has an integral structure obtained by pressing a metallic plate into a rectangular shape. A circular upper through hole (i.e., a first recess) 23a, to which the upper projection 27 of the upper cap 21 is fitted, is formed in such a manner as to penetrate in the thickness direction. Referring to FIGS. 1 and 2, the pair of upper caps 21 are mounted on each of the five electric cells 2 except for the rightmost and leftmost electric cells 2 in the drawings out of the seven electric cells 2. One upper cap 21 is mounted on each of the leftmost electric cell 2 in the drawings, in which the external terminal 7A functions as the positive electrode for the battery assembly 1, and the rightmost electric cell 2 in the drawings, in which the external terminal 7B functions as the negative electrode for the battery assembly 1. In other words, the battery assembly 1 includes the twelve upper caps 21 in total, and further, each of the upper caps 21 has one upper projection 27, as described above, in the present preferred embodiment. In the upper holder 23, the twelve upper through holes 23a in total are formed at the positions corresponding to the upper projections 27 of the upper cap 21.

In the upper holder 23, notched module openings 23b and 23c for exposing the external terminals 7A and 7B are formed at a corner corresponding to the external terminal 7A (i.e., the positive electrode for the battery assembly 1) of the leftmost electric cell 2 and a corner corresponding to the external terminal 7B (i.e., the negative electrode for the battery assembly 1) of the rightmost electric cell 2 in FIGS. 1 and 2. Terminal protecting covers 36A and 36B are detachably attached to the module openings 23b and 23c, respectively.

Figure 3:
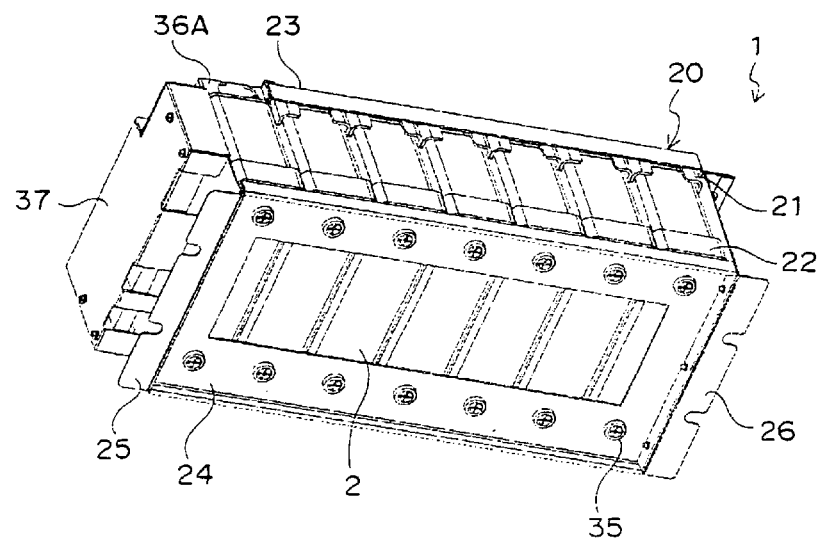
FIG. 3 is a perspective view of the battery assembly in the first preferred embodiment, as viewed from below.

The lower holder 24 in the present preferred embodiment has an integral structure obtained by pressing a metallic plate. A ventilation opening 24a having substantially rectangular contour and a large area is formed at the center of the lower holder 24, and therefore, exhibits a rectangular frame as a whole. Circular lower through holes (i.e., second recesses) 24b to be fitted to lower projections 35 of the lower cap 22 are formed at the lower holder 24 in such a manner as to penetrate in the thickness direction. Referring to FIGS. 1 to 3, the lower caps 22 are fitted to all of the seven electric cells 2. Here, each of the lower caps 22 is provided with the two lower projections 35, as described above. Consequently, the fourteen lower through holes 24b in total are formed at positions corresponding to the lower projections 35, respectively, in the lower holder 24.

Referring to FIGS. 1 to 3, in the upper cap 21 disposed at the upper end of the electric cell 2, the upper projection 27 is fitted into the upper through hole 23a, and further, the top wall 21a abuts against the lower surface of the upper holder 23. In contrast, in the lower cap 22 disposed at the lower end of the electric cell 2, the lower projection 35 is fitted into the lower through hole 24b, and further, the bottom wall 22a abuts against the upper surface of the lower holder 24. The upper holder 23 and the lower holder 24 are joined to each other via the side parts 25 and 26 while holding the seven electric cells 2 therebetween via the upper caps 21 and the lower caps 22. The side part 25, to which the monitor 37 is attached, is disposed adjacently to the leftmost electric cell 2 in the drawings whereas the other side part 26 is disposed adjacently to the rightmost electric cell 2 in the drawings. Each of the side parts 25 and 26 in the present preferred embodiment has an integral structure obtained by pressing a metallic plate into a rectangular shape. In the present preferred embodiment, the upper and lower ends of the side parts 25 and 26 are connected to the upper holder 23 and the lower holder 24 via screws, respectively.

The upper holder 23 and the lower holder 24 may be constituted of a plurality of members as long as they can securely hold the electric cells 2 therebetween via the upper caps 21 and the lower caps 22. In the same manner, the side parts 25 and 26 also may be constituted of a plurality of members as long as the upper holder 23 and the lower holder 24 can securely hold the electric cells therebetween, and therefore, they may be connected to the upper holder 23 and the lower holder 24 via means other than screwing. Moreover, one or both of the side parts 25 and 26 may have a structure integral with the upper holder 23 or the lower holder 24. In summary, the specific configuration of each of the upper holder 23, the lower holder 24, and the side portions 25 and 26 is not specially limited as long as the electric cells 2 can be securely held therebetween via the upper caps 21 and the lower caps 22.

Figure 10:
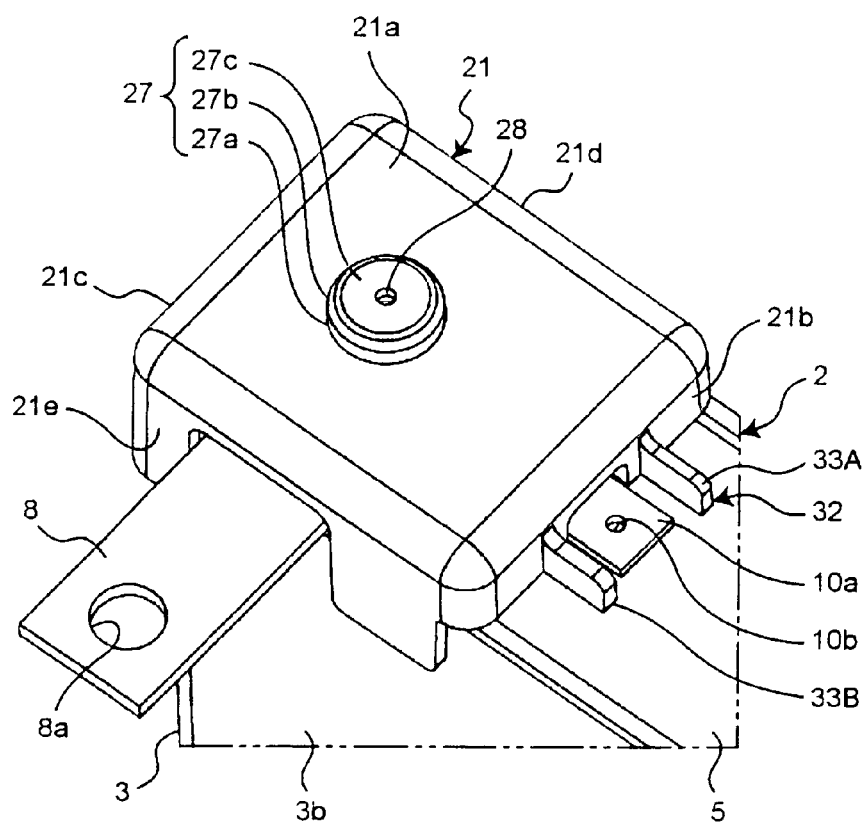
FIG. 10 is a perspective view of the upper cap disposed in the electric cell.
Figure 11:
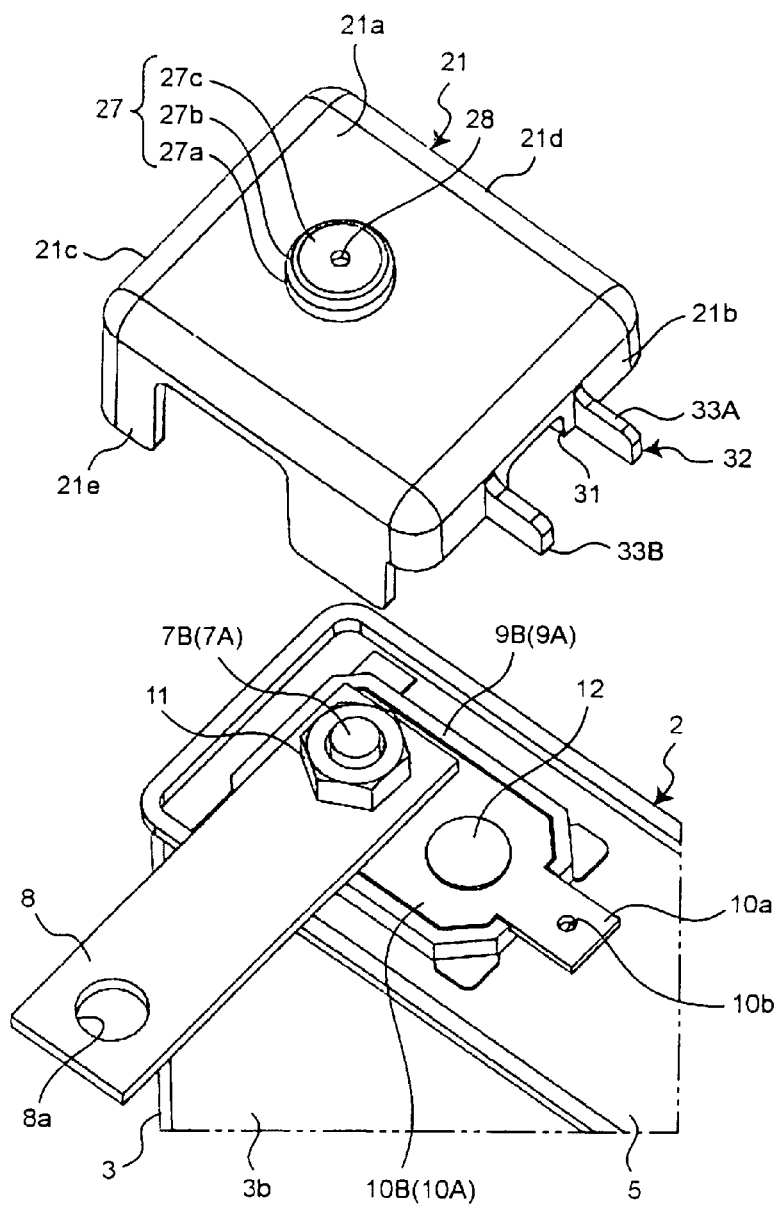
FIG. 11 is a perspective view of the upper cap detached from the electric cell.

Referring to FIGS. 10 and 11, the protector 32 in the present preferred embodiment includes the pair of rectangular ribs (i.e., extensions) 33A and 33B, each of which formed of a substantially elongated and flat plate extending along both sides of the inspecting terminal 10a from both sides of the terminal opening 31 on the front wall 21b. Referring to FIG. 5 together with FIGS. 10 and 11, the inspecting terminal 10a partly serving as each of the connecting rods 10A and 10B projects outward of the upper cap 21 through the terminal opening 31, wherein the upper ends of the ribs 33A and 33B are positioned above the inspecting terminal 10a (i.e., a position apart from the cover 5 for the electric cell 2). As a consequence, even if a metallic tool, for example, accidentally falls on the cover 5 for the electric cell 2, it cannot be brought into contact with the inspecting terminal 10a, thereby securely preventing short-circuiting. In other words, the protector 32 including the ribs 33A and 33B is formed in the upper cap 21, thus preventing an unintentional contact of the metallic tool or the like with the inspecting terminal 10a projecting from the upper cap 21 that may cause short-circuiting.

In the present preferred embodiment, the tips of the ribs 33A and 33B constituting the protector 32 are positioned in a position more apart from the front wall 21b of the upper cap 21 than the inspecting terminal 10a. In other words, the projection amount of each of the ribs 33A and 33B from the front wall 21b is greater than that of the inspecting terminal 10a from the front wall 21b. Consequently, the entire projecting portion of the inspecting terminal 10a from the front wall 21b is positioned on both sides thereof by the ribs 33A and 33B, thus securely preventing an unintentional contact of the metallic tool or the like with the inspecting terminal 10a. Here, even if the projection amount of each of the ribs 33A and 33B from the front wall 21b is equal to or smaller than that of the inspecting terminal 10a from the front wall 21b, an effect of protecting the inspecting terminal 10a from an unintentional contact of the metallic tool or the like can be expected at least to some extent as long as the tips of the ribs 33A and 33B are positioned above the inspecting terminal 10a. Alternatively, even with the configuration of either one of the ribs 33A and 33B, an effect of protecting the inspecting terminal 10a can be expected at least to some extent.

The ribs 33A and 33B are spaced on both sides of the inspecting terminal 10a, as viewed on a plane. In other words, the ribs 33A and 33B neither cover nor conceal the inspecting terminal 10a. Therefore, even when the upper cap 21 is disposed, an electric wire for connecting the connecting rods 10A and 10B to the monitor 37 can be connected to the inspecting terminal 10a, for example.

In a case where a jig for protecting the inspecting terminal 10a from being brought into contact with the metallic tool is disposed independently of the upper cap 21, the jig need be finally detached. To the contrary, the protector 32 including the ribs 33A and 33B is disposed in the upper cap 21 in the present preferred embodiment, and therefore, the upper cap 21 once disposed in the bas bar 8 which is disposed in the external terminals 7A and 7B of the electric cells 2 need not normally be detached.

As described above, the ribs 33A and 33B (i.e., the protector 32) formed in the upper cap 21 cannot interfere the connection work with respect to the inspecting terminal 10a, and further, the upper cap 21 including the ribs 33A and 33B need not be detached after it is once disposed in the electric cell 2. Thus, the excellent assembling performance can be secured.

Hereinafter, explanation will be made on modifications of the upper projection 27 with reference to FIGS. 12A to 12C.

Figure 12A:
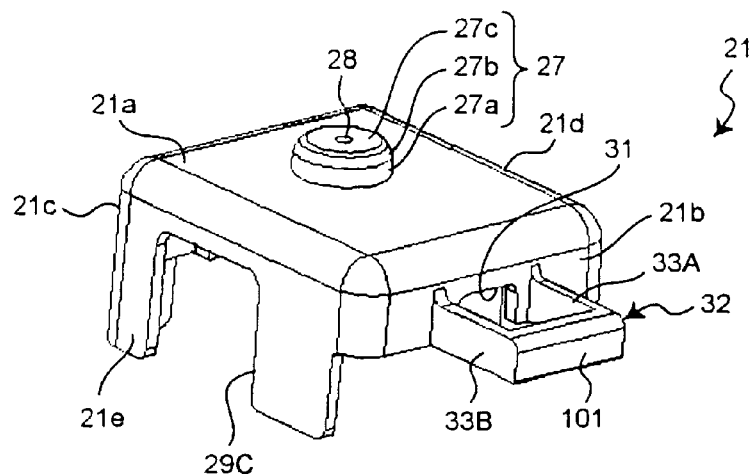
FIG. 12A is a perspective view of an upper cap in a first modification.

In a modification of a protector 32 shown in FIG. 12A, the tips of ribs 33A and 33B are connected to each other via a connector 101. The protector 32 including the ribs 33A and 33B and the connector 101 exhibits the shape of a rectangular frame having openings at upper and lower ends thereof.

Figure 12B:
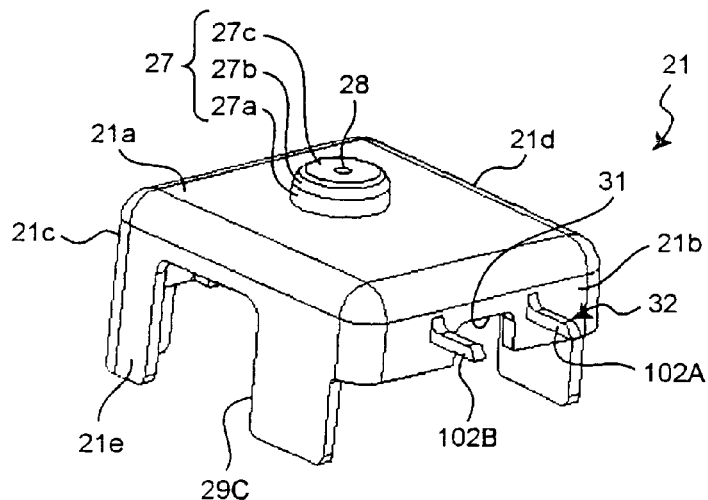
FIG. 12B is a perspective view of an upper cap in a second modification.

In another modification of a protector 32 shown in FIG. 12B, there are provided a pair of pins 102A and 102B extending along both sides of an inspecting terminal 10a from both sides of a terminal opening 31 on a front wall 21b. The pins 102A and 102B are located above the inspecting terminal 10a (i.e., a position apart from a cover 5 for an electric cell 2).

Figure 12C:
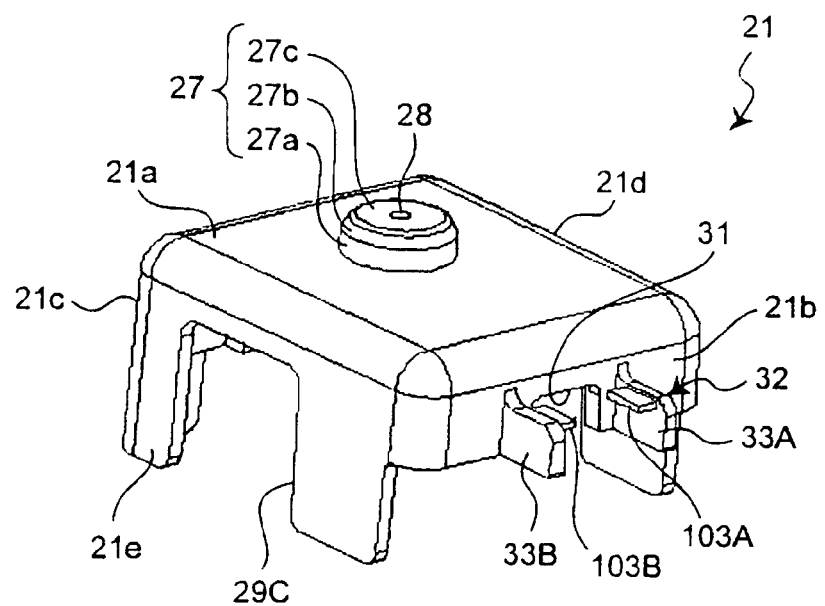
FIG. 12C is a perspective view of an upper cap in a third modification.
Figure 13:
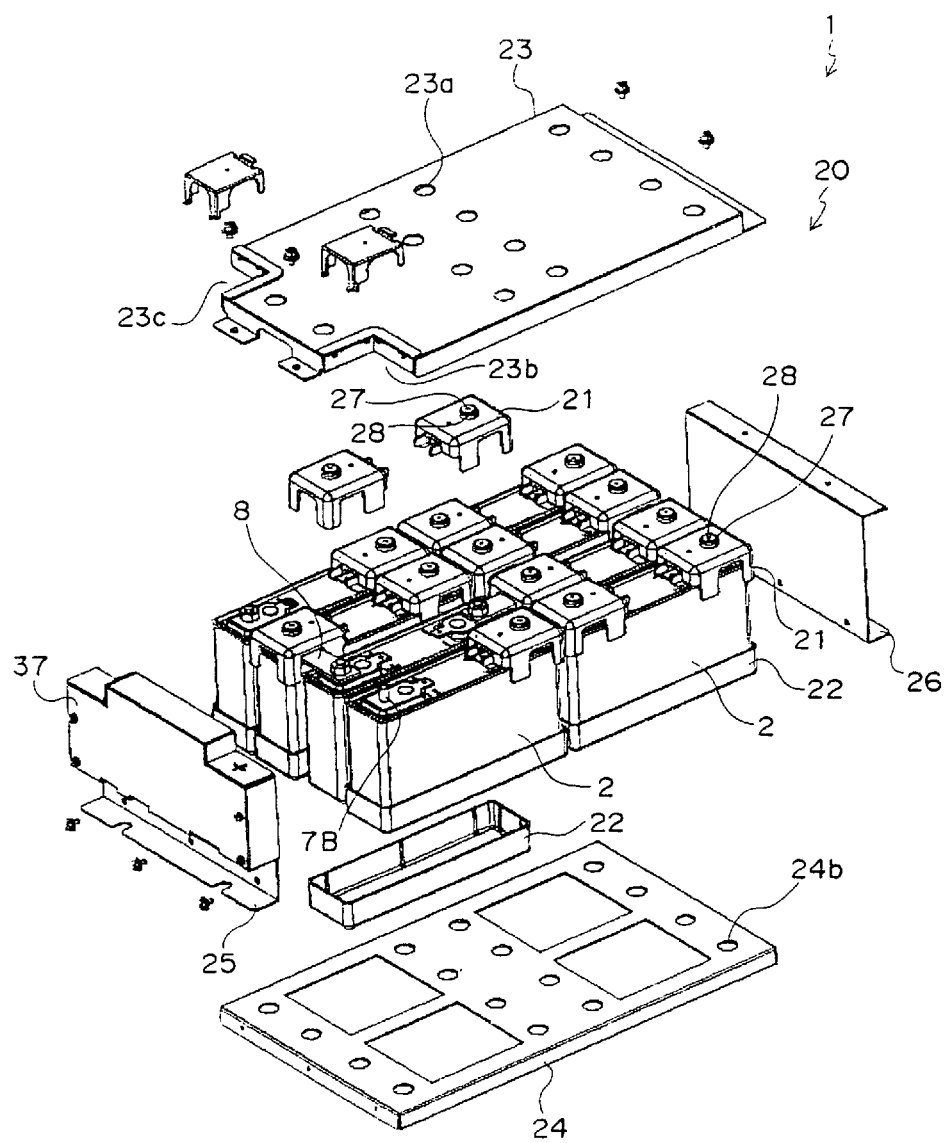
FIG. 13 is an exploded perspective view of a battery assembly in a second preferred embodiment according to the present invention.
Figure 14:
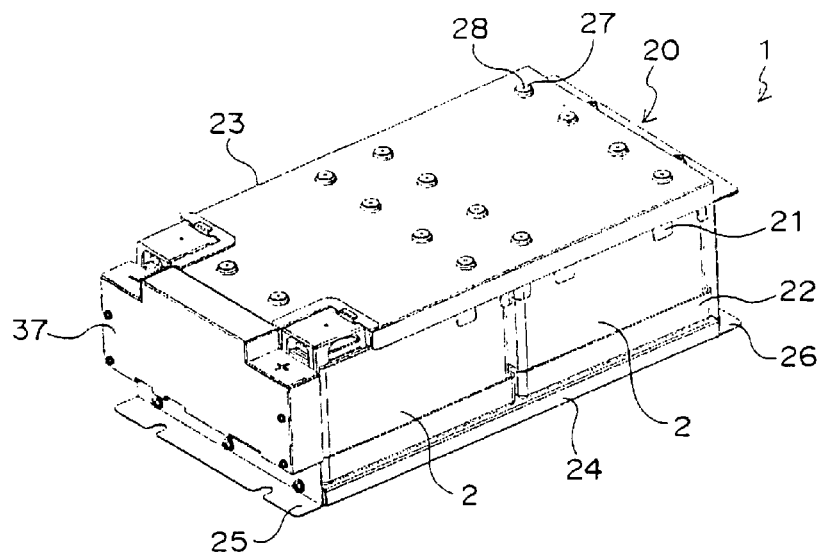
FIG. 14 is a perspective view of the battery assembly in the second preferred embodiment, as viewed from above.
Figure 15:
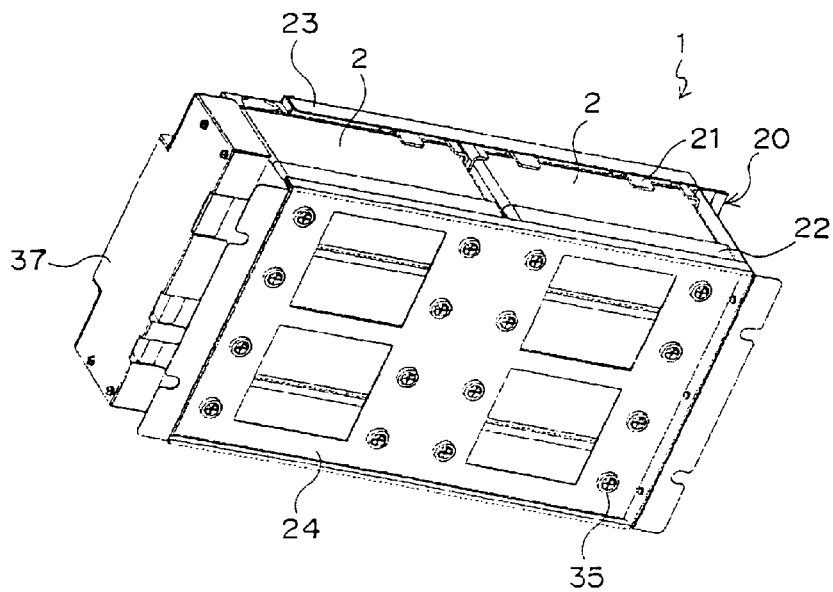
FIG. 15 is a perspective view of the battery assembly in the second preferred embodiment, as viewed from below.

In a further modification of a protector 32 shown in FIG. 12C, plate-like protrusions 103A and 103B protruding oppositely to each other are formed inside of plate-like ribs 33A and 33B, respectively. When an upper cap 21 is mounted on an electric cell 2 (see FIG. 10), the plate-like protrusions 103A and 103B are located above both sides of an inspecting terminal 10a at a position nearer a front wall 21b than a screw hole 10b. In other words, the plate-like protrusions 103A and 103B cover a part (i.e., both sides) of the inspecting terminal 10a, as viewed on a plane. The protrusions 103A and 103B slightly cover the inspecting terminal 10a, thus securely protecting the inspecting terminal 10a from an unintentional contact of a metallic tool or the like. In the meantime, the tips of the plate-like protrusions 103A and 103B are sufficiently spaced from each other, so that the plate-like protrusions 103A and 103B cannot interfere with work for connecting an electric wire or the like to the inspecting terminal 10a.

As is obvious from the modifications shown in FIGS. 12A to 12C, the inspecting terminal 10a can be protected from an unintentional contact as long as the protector 32 is at least partly located above the inspecting terminal 10a. A specific shape of the protector 32 to be formed in the upper cap 21 is not limited as long as the protector 32 is disposed adjacently to the inspecting terminal 10a, at least a part of the protector 32 is located above the inspecting terminal 10a, and the protector 32 can neither cover nor conceal the inspecting terminal 10a.

According to the embodiment, the cap includes the protector which is disposed adjacently to a part of the external terminal unit and whose at least part is located in a position more apart from the package than a part of the external terminal unit, thus securing an excellent assembling performance while enhancing the safety of assembling work.

According to the embodiment, an electric wire or the like to be connected to a monitor can be connected to the second terminal. Moreover, it is possible to prevent any unintentional contact of a metallic tool or the like with the second terminal.

According to the embodiment, it is possible to securely prevent any unintentional contact of a metallic tool or the like with the second terminal sideways.

According to the embodiment, it is possible to securely prevent any unintentional contact of a metallic tool or the like with the second terminal from above.

Second Preferred Embodiment

Figure 16:
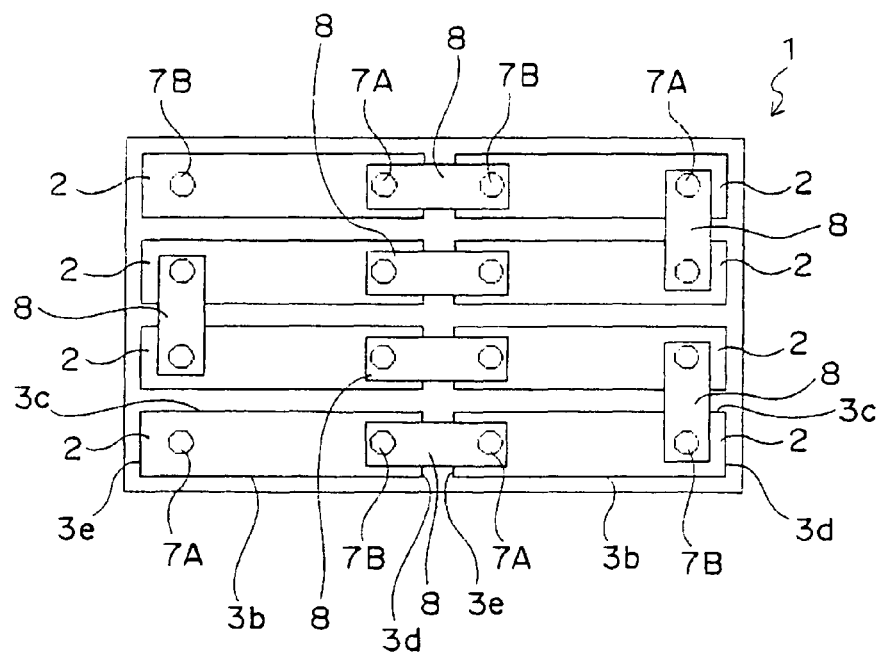
FIG. 16 is a schematic plan view of a connection path for electric cells in the battery assembly in the second preferred embodiment.

FIGS. 13 to 16 show a battery assembly 1 in a second preferred embodiment according to the present invention. The battery assembly 1 includes eight electric cells 2 of the same square type as those in the first preferred embodiment. Specifically, the four electric cells 2 are arranged in two rows. As shown in FIG. 16, external terminals 7A and 7B disposed in each of the electric cells 2 from the electric cell 2 at a lower left corner to the electric cell 2 at an upper left corner are connected to external terminals 7A and 7B of the adjacent electric cell 2 in the same or different rows via bus bars 8, so that the eight electric cells 2 are connected in series.

In the battery assembly 1 in the second preferred embodiment as well as that in the first preferred embodiment, an inspecting terminal 10a in a connecting rod 10A or 10B projecting outward of an upper cap 21 is protected by a protector 32 including ribs 33A and 33B projecting from a front wall 21b of the upper cap 21. The upper ends of the ribs 33A and 33B are located above the inspecting terminal 10a, and therefore, a metallic tool or the like cannot be brought into contact with the inspecting terminal 10a even if the metallic tool or the like accidentally falls on a cover 5 for the electric cell 2, thereby preventing short-circuiting. Inclusive of the modifications shown in FIGS. 12A to 12C, the modifications which have described regarding the first preferred embodiment are applicable to the battery assembly 1 in the second preferred embodiment.

The other configuration and operation in the second preferred embodiment are identical to those in the first preferred embodiment. Thus, the same constituent elements are designated by the same reference numerals as those in the first preferred embodiment, and therefore, their explanation will not be given.

What is claimed is:

1. An electric cell, comprising:
a package including a first surface;
an external terminal unit disposed at the first surface of the package, the external terminal unit including a first terminal and a second terminal; and
a cap disposed at the first surface of the package and covering the first terminal, the cap including a wall extending substantially perpendicular to the first surface and a protector,
wherein the second terminal is connected to the first terminal and protrudes from the wall of the cap,
wherein the protector is disposed adjacently to the second terminal, and
wherein an upper edge of the protector is located in a position more apart from the package than an upper edge of the second terminal.

2. An electric cell according to claim 1, wherein the cap includes walls surrounding the first terminal in the external terminal unit, the first terminal being electrically connected to a conductive member projecting from the wall of the cap, and the second terminal being protected by the protector.

3. An electric cell according to claim 2, wherein the second terminal projects inward from one end of the package along the package.

4. An electric cell according to claim 2, wherein the protector includes an extension projecting from the wall and extending along a side of the second terminal.

5. An electric cell according to claim 4, wherein a tip of the extension is located in a position more apart from the wall than a tip of the second terminal.

6. An electric cell according to claim 4, wherein the extension includes a plurality of ribs spaced with a clearance on both sides of the second terminal.

7. An electric cell according to claim 6, wherein the plurality of ribs are connected at tips thereof to each other via a connector.

8. An electric cell according to claim 6, wherein the plurality of ribs include protrusions protruding oppositely to each other.

9. An electric cell according to claim 4, wherein an upper end of the protector is located above the second terminal.

10. An electric cell according to claim 1, the electric cell being formed into a substantially rectangular shape and including a top surface formed into a rectangular shape, as viewed on a plane, including long sides and short sides, both end surfaces extending from short pieces at both ends of the long sides of the top surface in a substantially orthogonal direction, and both side surfaces extending from long sides at both ends of the short sides of the top surface in a substantially orthogonal direction
wherein the cap includes a top wall formed into a rectangular shape, as viewed on a plane, in parallel to the top surface, a first end wall extending along one of the end surfaces from the top wall, a second end wall extending toward the top surface, and first and second side walls extending along both side surfaces, and the protector extends oppositely to the first end wall along the long sides from the second end wall.

11. A battery assembly comprising an electric cell which includes:
a package including a first surface;
an external terminal unit disposed at the first surface of the package, the external terminal unit including a first terminal and a second terminal; and a cap disposed at the first surface of the package and covering the first terminal the cap including a wall extending substantially perpendicular to the first surface and a protector, wherein the second terminal is connected to the first terminal and protrudes from the wall of the cap, wherein the protector is disposed adjacently to the second terminal, and wherein an upper edge of the protector is located in a position more apart from the package than an upper edge of the second terminal.

12. A battery assembly according to claim 11, further comprising an abutment for the cap, the abutment being disposed at one end of the package and abutting against the cap, wherein the abutment enables the plurality of electric cells to be positioned.

13. The electric cell according to claim 1, wherein the second terminal has a plate shape.

14. The electric cell according to claim 1, wherein, in a top view, the second terminal is exposed from the cap.

15. The electric cell according to claim 1, further comprising:

a connecting plate electrically connects to a power generating element, wherein the connecting plate comprises the second terminal.

16. The electric cell according to claim 1, wherein a distance between an upper surface of the protector and the first surface of the package is more than a distance between an upper surface of the second terminal and the first surface of the package.

17. The electric cell according to claim 1, wherein the protector comprises a pair of extensions that protrude from the wall of the cap in a same direction that the second terminal protrudes from the wall of the cap.

18. The electric cell according to claim 17, wherein the second terminal protrudes from the wall of the cap within an opening provided between the pair of the extensions of the protector.

19. The electric cell according to claim 18, wherein an entirety of the second terminal is located between side surfaces of the pair of the extensions of the protector, and wherein, with respect to the first surface of the package, an upper surface of the second terminal is located lower than upper surfaces of the extensions of the protector.

* * * * *